(12) United States Patent
Evitt

(10) Patent No.: US 11,549,536 B2
(45) Date of Patent: Jan. 10, 2023

(54) CONNECTOR

(71) Applicant: TECNA DISPLAY LIMITED, London (GB)

(72) Inventor: Jonathan Evitt, London (GB)

(73) Assignee: TECNA DISPLAY LIMITED, London (GB)

( * ) Notice: Subject to any disclaimer, the term of this patent is extended or adjusted under 35 U.S.C. 154(b) by 446 days.

(21) Appl. No.: 16/632,312

(22) PCT Filed: Jul. 16, 2018

(86) PCT No.: PCT/GB2018/052013
§ 371 (c)(1),
(2) Date: Jan. 17, 2020

(87) PCT Pub. No.: WO2019/016529
PCT Pub. Date: Jan. 24, 2019

(65) Prior Publication Data
US 2020/0362894 A1    Nov. 19, 2020

(30) Foreign Application Priority Data

Jul. 21, 2017  (GB) ..................................... 1711796

(51) Int. Cl.
*F16B 7/18*    (2006.01)
*F16B 37/04*   (2006.01)
*F16B 37/12*   (2006.01)

(52) U.S. Cl.
CPC ............ *F16B 7/187* (2013.01); *F16B 37/045* (2013.01); *F16B 37/122* (2013.01); *F16B 7/18* (2013.01)

(58) Field of Classification Search
CPC .... F16B 2/02; F16B 7/18; F16B 7/187; F16B 37/04; F16B 37/045; F16B 37/122;
(Continued)

(56) References Cited

U.S. PATENT DOCUMENTS 4,442,571 A * 4/1984 Davis ...................... F16B 21/04
                                                24/DIG. 59
4,545,697 A * 10/1985 Verdenne .............. F16B 37/044
                                                403/252
(Continued)

FOREIGN PATENT DOCUMENTS

CN        2378562 Y      5/2000
CN       101563543 B     7/2011
(Continued)

OTHER PUBLICATIONS

International Search Report and Written Opinion dated Sep. 21, 2018 in connection with corresponding International Application No. PCT/US2018/052013.
(Continued)

*Primary Examiner* — Roberta S Delisle
(74) *Attorney, Agent, or Firm* — Stout, Uxa & Buyan, LLP; Donald E. Stout

(57) ABSTRACT

A connector (1) for releasably engaging a slot (10) in a support member (11). The connector (1) includes a body (2) in having a blind bore (20), within which is received a retaining element (3), a threaded insert (4) and a bolt (5) with a shaft (50). The threaded insert (4) provides a threaded hole (40) that receives the shaft (50). The bolt (5) has a head (51) at a first end of the shaft (50) and the retaining element (3) is secured to a second end thereof to inhibit removal of the shaft (50) from the body (2). The shaft (5) has a central threaded portion (55) between the head (51) and the retaining element (3) to engage the threaded hole (40) such that rotation of the body (2) relative to the bolt (5) draws the head (51) toward the body (2) to captivate and clamp an overhang (13) of the slot (10) in the support member (11) between the head (51) and the body (2).

14 Claims, 4 Drawing Sheets

(58) Field of Classification Search
CPC ...... F16B 41/00; Y10T 403/7062; E05B 3/00; E05B 79/06
USPC .............................. 403/373; 16/412, 414, 433
See application file for complete search history.

(56) References Cited

U.S. PATENT DOCUMENTS

| | | | | |
|---|---|---|---|---|
| 2011/0121153 | A1* | 5/2011 | Magno, Jr. ............... | F16B 7/187 248/316.1 |
| 2012/0315106 | A1* | 12/2012 | Amedt .................... | F16B 7/187 411/85 |
| 2014/0093307 | A1* | 4/2014 | Zhang .................... | F16B 9/054 403/188 |
| 2019/0017528 | A1* | 1/2019 | Wersland .............. | F16B 21/186 |
| 2020/0313611 | A1* | 10/2020 | Ash .......................... | F16B 2/12 |
| 2020/0392975 | A1* | 12/2020 | Meyer .................. | F16B 37/045 |

FOREIGN PATENT DOCUMENTS

| | | |
|---|---|---|
| CN | 106194948 B | 12/2016 |
| DE | 102006025036 A1 | 11/2007 |
| DE | 102009056907 A1 | 6/2011 |
| EP | 0123683 B1 | 11/1984 |
| EP | 0713018 A | 5/1996 |
| EP | 2094975 B1 | 11/2015 |
| GB | 1140106 A | 1/1969 |
| GB | 2461621 A | 1/2010 |
| GB | 2480475 A | 11/2011 |
| GB | 2493469 A | 2/2013 |
| WO | 2008062161 A | 5/2008 |

OTHER PUBLICATIONS

Search Report dated Jan. 17, 2018 in connection with corresponding UK Patent Application No. GB1711796.1.
Office Action dated Mar. 24, 2021 in connection with corresponding Chinese Patent App. No. 201880049018.7.

* cited by examiner

CONNECTOR

This invention relates generally to connectors and more particularly to connectors for frames and the like. More specifically, although not exclusively, this invention relates to connectors and brackets for releasably engaging a slot in a support member of a frame or frame system, which may form part of a frame of the kind which are formed of a plurality of support members, such as beams, joined together to form a three dimensional shape to which display panels are secured.

Connectors and brackets for engaging slots in profiled support members are known. One application for such connectors is display frames of the kind which are formed of a plurality of beams joined together to form a three dimensional shape to which display panels are secured. Known display frames of this type include multi-way node fittings to provide modular assemblies that are easy to assemble and disassemble. One such display system is described in WO2008062161 by the present applicant. The beams of this display system include slots formed by lips extending from each corner edge of the beam.

GB2480475 describes a support bracket for use in a display frame of the kind described in WO2008062161. The support bracket includes a body with a socket or receptacle for receiving a resilient plug, a knob with a threaded hole and a flange member with a threaded shaft and a flange plate at one end of the shaft. The shaft of the flange member extends through a hole in the body and engages the threaded hole of the knob. A spring surrounds the shaft of the flange member and is compressed between the flange plate and the knob to preload the threaded engagement between the shaft and the knob. This preload causes the flange member to rotate with the knob until the flange plate engages lips of a beam, at which point continued rotation of the knob draws the flange plate toward the body and captivates or clamps the lips between the flange plate and the body to secure the support bracket to the beam.

Whilst effective for releasably securing the support bracket to the beam, it has been observed that excessive rotation of the knob to release the bracket from the beam can result in the shaft of the flange member being removed from the knob. This requires reassembly of the support bracket, which can be time consuming.

It would therefore be advantageous to provide a connection means that mitigates this issue. It would also be advantageous to provide an improved and/or more versatile connector, preferably one that is easier to use.

Accordingly, a first aspect of the invention provides a connector, e.g. for releasably engaging a slot in a support member, the connector comprising a body with a hole and a bolt with a shaft received within the hole, a head at or adjacent a first end of the shaft and a retaining element secured to the shaft at or adjacent a second end thereof to inhibit removal of the shaft from the body, wherein the shaft and the hole comprise engaging features that cooperate, in use, to draw the head of the bolt toward the body to captivate or clamp an overhang of a slot in a support member between the head and the body.

Thus, the bolt is retained with the body to prevent inadvertent separation, thereby precluding the need to reassemble the connector.

The engaging features may comprise threads, for example the shaft may comprise a threaded portion, e.g. a central threaded portion, and/or the hole may comprise a threaded hole or at least a threaded portion. The threaded portion of the shaft may be between the head and the retaining element. The threaded portion of the shaft may engage the threaded hole such that rotation, in use, of the body relative to the bolt draws the head toward the body, for example to captivate or clamp an overhang of a slot in a support member between the head and the body.

Another aspect of the invention provides a connector, e.g. for releasably engaging a slot in a support member, the connector comprising a body with a threaded hole and a bolt with a shaft received within the threaded hole, a head at or adjacent a first end of the shaft and a retaining element secured to the shaft at or adjacent a second end thereof to inhibit removal of the shaft from the body, wherein the shaft comprises a central threaded portion between the head and the retaining element to engage the threaded hole such that rotation, in use, of the body relative to the bolt draws the head toward the body to captivate or clamp an overhang of a slot in a support member between the head and the body.

The body may comprise a bore, which may comprise a threaded portion. The threaded hole of the body may comprise or be provided by the threaded portion of the bore. The threaded portion of the bore may be at or adjacent an open end thereof. The bore may comprise a non-threaded portion, for example within which the retaining element is received. The threaded hole may comprise or be provided by an insert, e.g. a threaded insert, received in the or an open end of the bore. The body may comprises a threaded insert secured in the open end of the bore to provide the threaded hole.

The bore may comprise a closed end. The bore may comprise a blind bore. The non-threaded portion of the bore may be between the closed end thereof and the threaded portion thereof. The retaining element may be captivated or clamped between the or a closed end of the blind bore and the threaded portion thereof, for example the insert.

The shaft may comprise a threaded end portion. The retaining element may comprise a resilient tubular element. The resilient tubular element may surround and/or engage with at least a portion of the shaft, e.g. at least a portion of the threaded end portion. The retaining element may comprise a circlip, collect or an O-ring, e.g. for flexing over a nipple end or other formation in or on the shaft.

The resilient tubular element may engage the non-threaded portion of the bore, for example such that rotation, in use, of the body causes the bolt to rotate therewith, e.g. until the head engages with the slot.

The shaft may comprise one or more non-threaded portions. The non-threaded portion or one of the non-threaded portions may be between the central threaded portion and the threaded end portion. Additionally or alternatively, the non-threaded portion or one of the non-threaded portions may be between the central threaded portion and the head of the bolt.

The thread configuration, for example the thread diameter and/or pitch, of the threaded end portion may be similar to, or substantially the same, as the thread configuration, for example the thread diameter and/or pitch, of the central threaded portion.

The resilient tubular element may comprise a coiled element, such as a spring, or a solid hollow cylinder. In embodiments, the resilient tubular element may comprise a close wound spring, which may be formed of a metal, e.g. steel or stainless steel, or a plastics material, e.g. an engineering plastics material, e.g. an aliphatic or semi-aromatic polyamide such as Nylon®.

The body may comprise a knob, handle or other gripping means or member and/or may have a gripping surface. The body may be for manual rotation of the body. The gripping surface may be smooth or comprise one or more grooves, depressions, projections, knurls or any other surface feature.

Another aspect of the invention provides a bracket, e.g. a mounting bracket, comprising a connector as described above and a mounting member, which may be captivated or clamped between the body and the head of the bolt.

The mounting member of the bracket may surround the non-threaded portion of the bolt, for example between the central threaded portion and the head of the bolt. Additionally or alternatively, the mounting member may comprises a plate, which may have one or more mounting features thereon or therein.

Another aspect of the invention provides a kit of parts, e.g. for assembly into a connector as described above. The kit may comprise one or more bodies (e.g. as described above or herein) and/or one or more bolts (e.g. as described above or herein) and/or one or more retaining elements (e.g. as described above or herein) and/or one or more threaded inserts (e.g. as described above or herein). Preferably, the kit comprises a plurality of one or more or each of the aforementioned components.

Another aspect of the invention provides a kit of parts, e.g. for assembly into a bracket as described above. The kit may comprise one or more bodies (e.g. as described above or herein) and/or one or more bolts (e.g. as described above or herein) and/or one or more retaining elements (e.g. as described above or herein) and/or one or more threaded inserts (e.g. as described above or herein) and/or one or more mounting brackets (e.g. as described above or herein). Preferably, the kit comprises a plurality of one or more or each of the aforementioned components.

Another aspect of the invention provides a kit of parts for assembly into a frame, e.g. a frame of support members or beams joined together to form a three dimensional shape. The kit may comprise one or more bodies (e.g. as described above or herein) and/or one or more bolts (e.g. as described above or herein) and/or one or more retaining elements (e.g. as described above or herein) and/or one or more threaded inserts (e.g. as described above or herein) and/or one or more mounting brackets (e.g. as described above or herein) and/or one or more support members or beams (e.g. as described above or herein). Preferably, the kit comprises a plurality of one or more or each of the aforementioned components.

Additionally or alternatively, the kit may comprise at least one connector kit as described above and/or at least one bracket kit as described above.

Another aspect of the invention provides a method of assembling a connector, e.g. a connector as described above, for releasably engaging a slot in a support member.

The method may comprise inserting a threaded shaft of a bolt into a threaded hole in a connector body. The method may comprise rotating the bolt, e.g. a head of the bolt, relative to the body, for example such that the threaded shaft engages with the threaded hole to translate the bolt along the body. Translation of the bolt along the body may engage a retaining element, for example to secure the retaining element to the shaft and/or for inhibiting removal of the shaft from the body.

The threaded hole may be provided by a threaded open end portion of a blind bore in the body. The method may comprise causing the shaft to force the retaining element against a closed end of the blind bore and/or over an end of the shaft, for example thereby securing the retaining element to the shaft.

The shaft may comprise a threaded end portion. The retaining element may comprise a resilient tubular element. The method may comprise rotating the shaft to force the threaded end portion into threaded engagement with the resilient tubular element. The resilient tubular element may comprises a coiled element. The method may comprise rotating the shaft to force the coiled element into the threads of the threaded end portion.

The blind bore may comprise a non-threaded portion, for example between the threaded open end portion and the closed end. The method may comprise inserting the retaining element into the non-threaded portion, e.g. before the shaft of the bolt is inserted into the threaded hole of the body.

The retaining element may be forced into engagement with the non-threaded portion of the blind bore, for example as it is forced over the end of the shaft. The forcing of the retraining element into engagement with the non-threaded portion may be carried out such that the bolt rotates with the body.

The method may comprise inserting the shaft of the bolt through a hole in a mounting member, for example before the shaft is inserted into the threaded hole of the body. Inserting the shaft through the hole in the mounting member may be carried out such that the mounting member is captivated or clamped between the body and the head of the bolt.

Another aspect of the invention provides a method of removably mounting a connector or bracket, e.g. a connector or bracket as described above, to a support member.

The method may comprise rotating a body of a connector in a first direction, e.g. to draw a head of a bolt engaged with a hole in the body toward the body and/or to captivate or clamp an overhang of a slot in the support member. The method may comprise rotating the body in a second direction opposite the first direction, e.g. to move the head of the bolt away from the body and/or to release the overhang. The method may comprise rotating the body in the second direction until a retaining element secured on the bolt engages the hole in the body, e.g. to inhibit removal of the bolt from the body.

For the avoidance of doubt, any of the features described herein apply equally to any aspect of the invention. For example, the connector may comprise any one or more features of the bracket or one of the methods relevant thereto and/or either of the methods may comprise any one or more features or steps relevant to one or more features of the connector or the bracket.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of one or more components of the connector or bracket described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1:
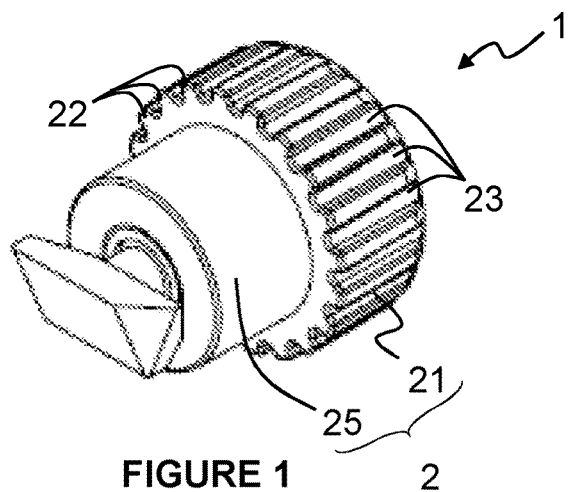
FIG. 1 is a perspective view of a connector according to an embodiment of the invention.
Figure 2:
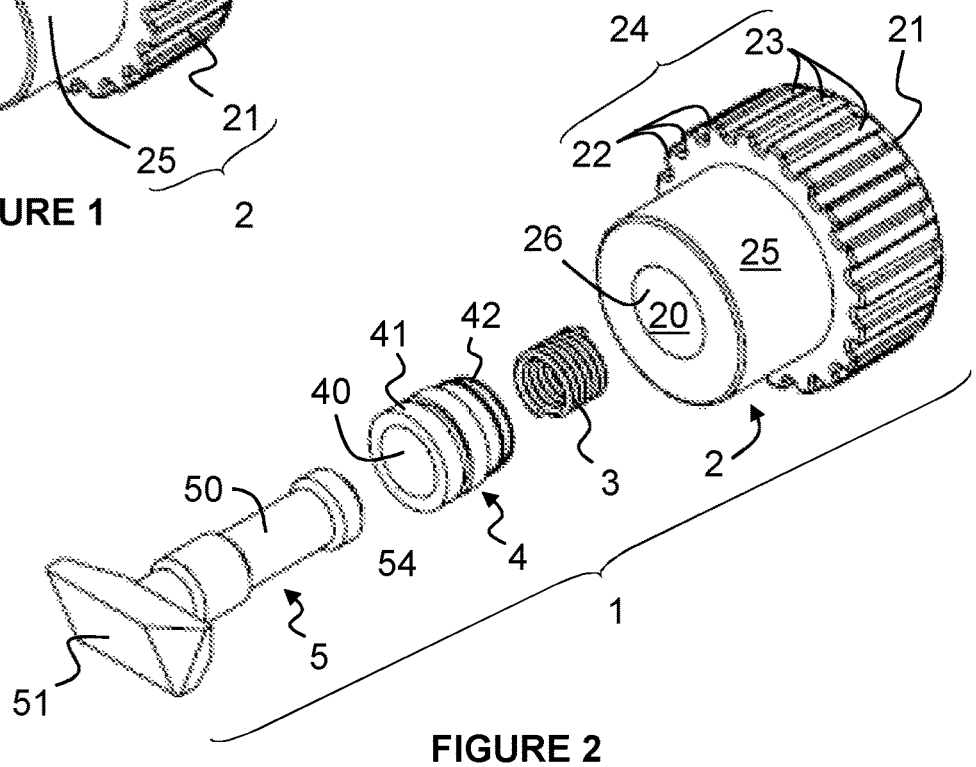
FIG. 2 is an exploded perspective view of the connector of FIG. 1.
Figure 3:
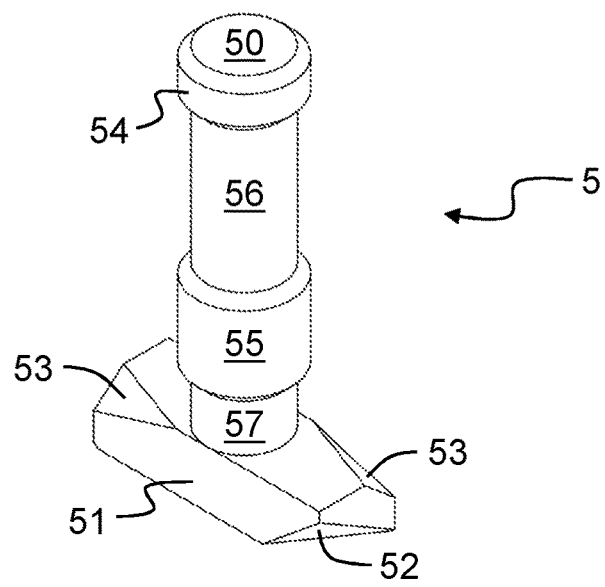
FIG. 3 is a perspective view of the bolt of the connector of FIGS. 1 and 2.
Figure 4:
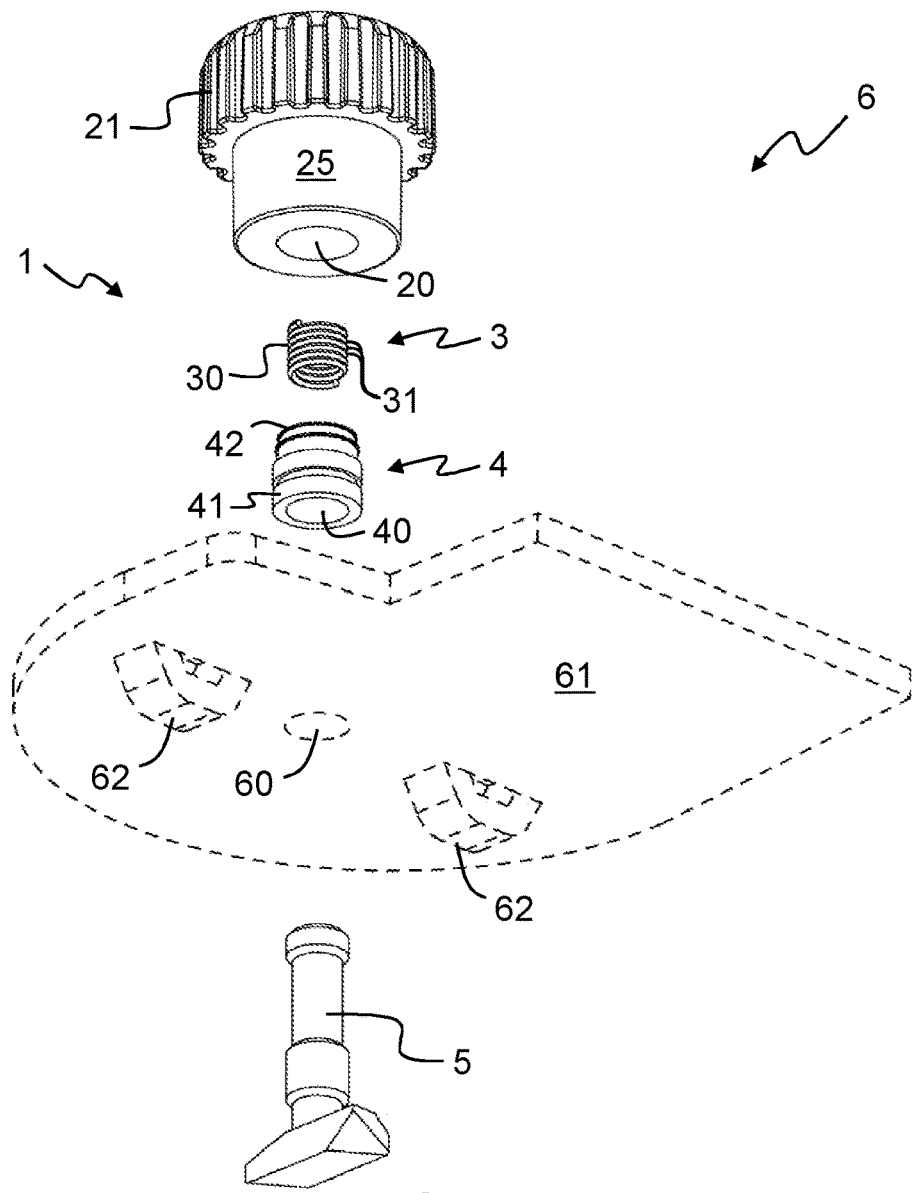
FIG. 4 is an exploded perspective view of a bracket assembly according to an embodiment of the invention.
Figure 5:
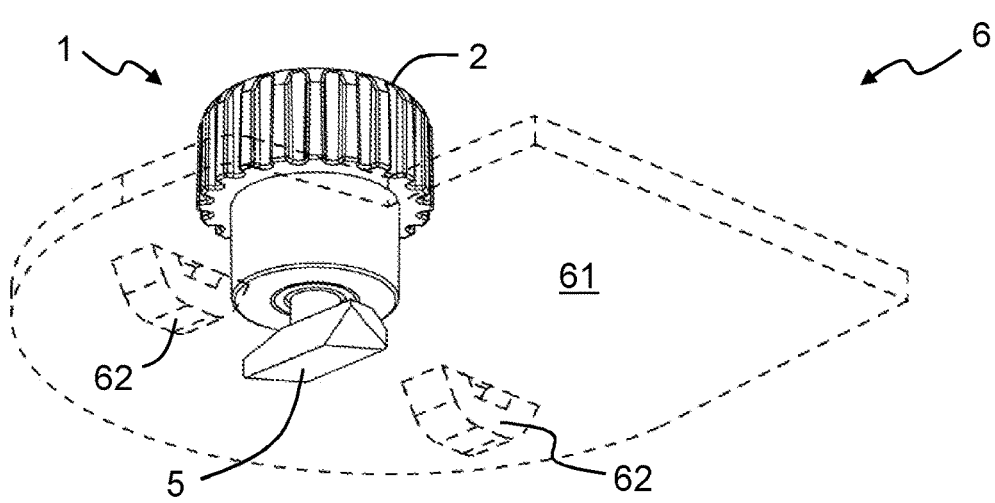
FIG. 5 is an assembled view of the bracket assembly of FIG. 4.
Figure 6:
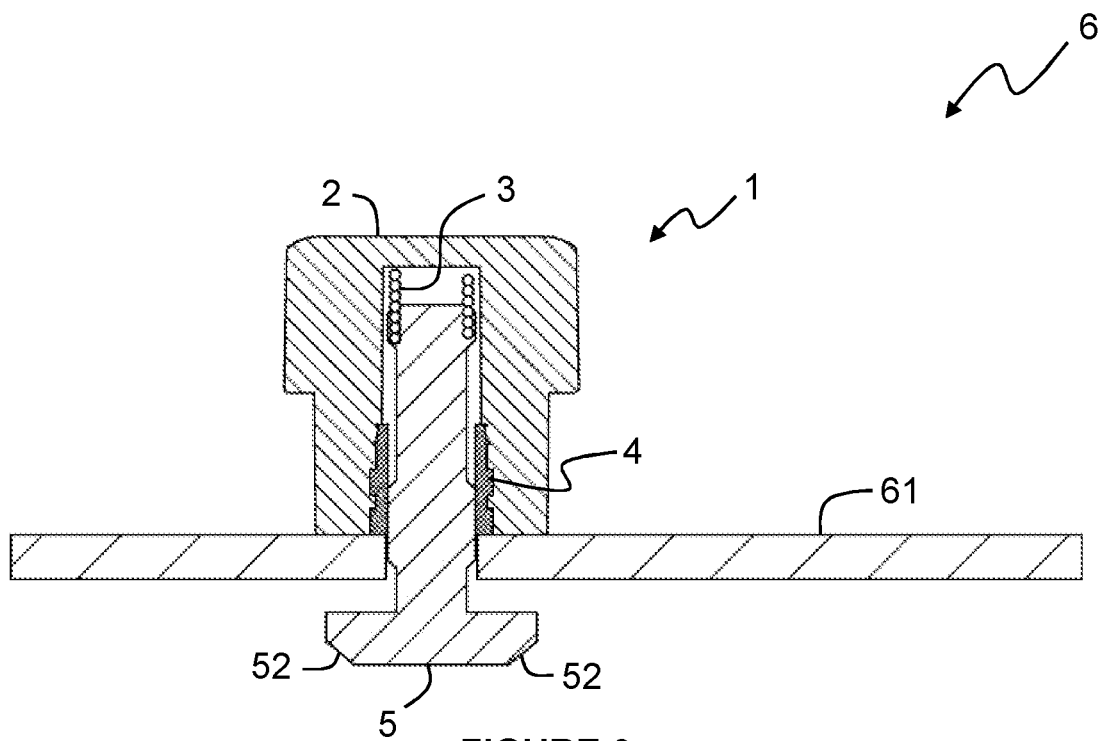
FIG. 6 is a section view of the bracket assembly of FIG. 5 showing the retaining spring partially engaged with the bolt.
Figure 7:
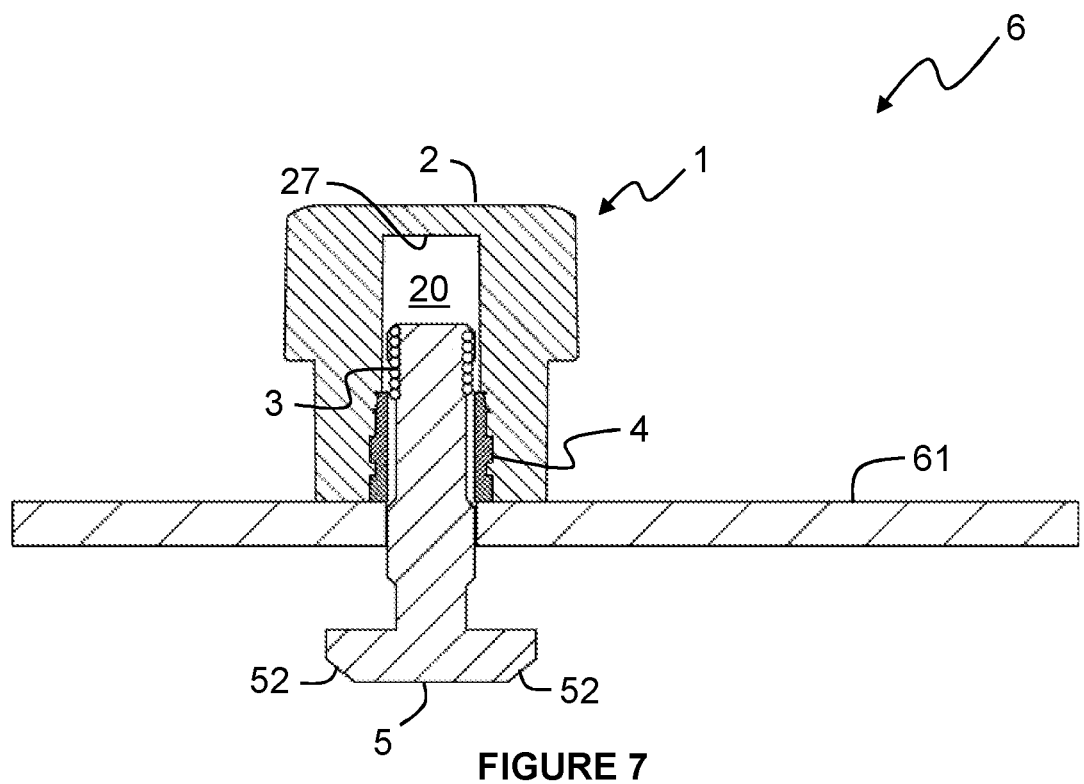
FIG. 7 is a section view similar to that of FIG. 6 showing the retaining spring fully engaged with the bolt and preventing removal of the bolt from the knob.
Figure 8:
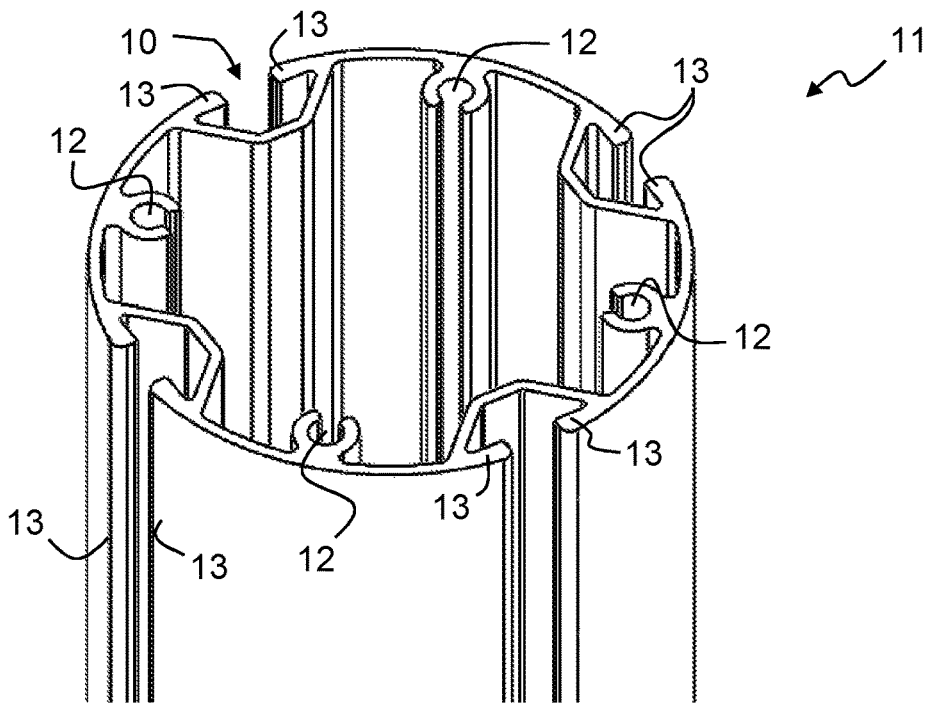
FIG. 8 is a perspective view of the end of a beam to which the connector of FIGS. 1-3 and the bracket assembly of FIGS. 4-7 are to be mounted.
Figure 9:
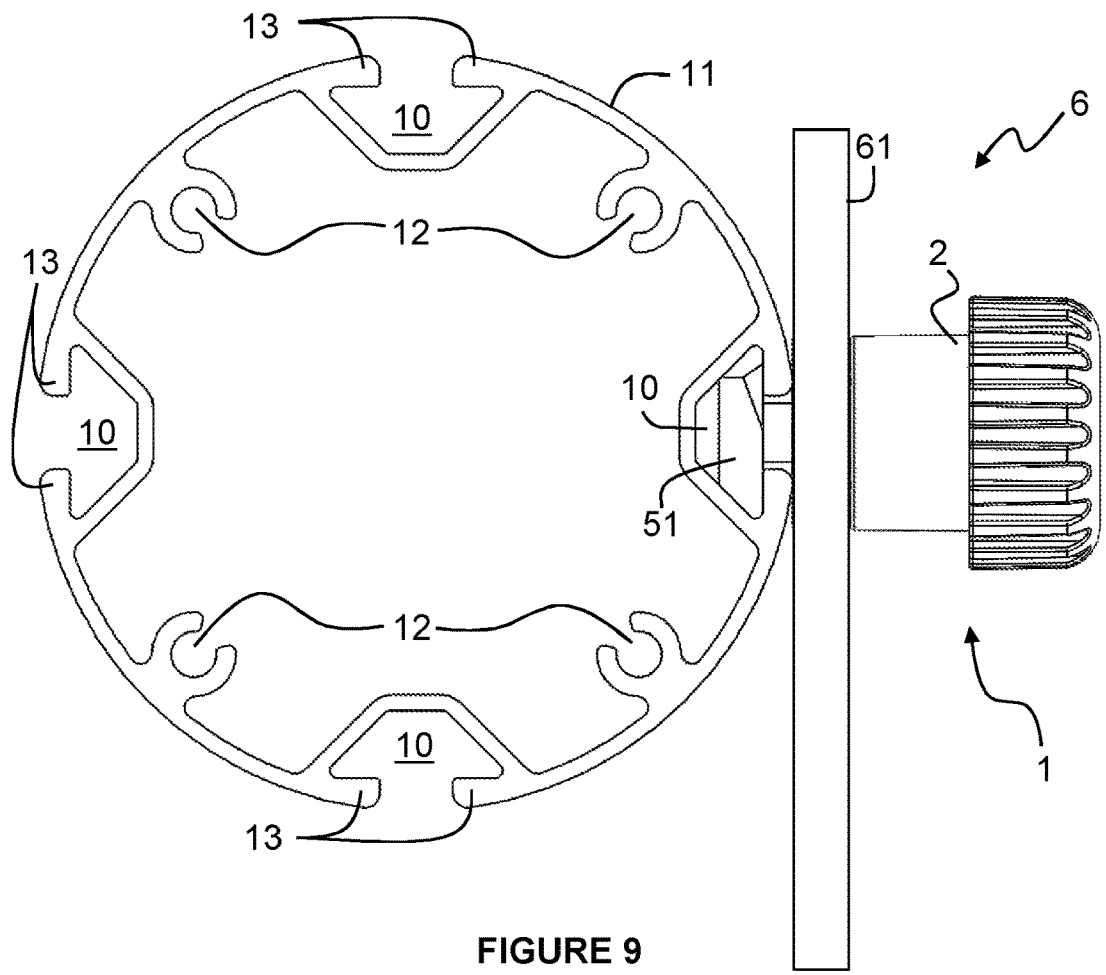
FIG. 9 is an end view of the bracket assembly of FIGS. 4-7 mounted and secured to the beam of FIG. 8.

Referring now to FIGS. 1-3, there is shown a connector 1 according to an embodiment of the invention for releasably engaging a slot 10 in a support member 11 (as shown in FIG. 8). The connector 1 includes a body 2 having a blind bore 20, within which is received a retaining element 3, a threaded insert 4 and a bolt 5.

The body 2 is in the form of a knob 2 in this embodiment and includes a gripping portion 21, which is substantially cylindrical and includes a plurality of axial ribs 22 and grooves 23 extending along its outer circumferential surface, which together form a gripping surface 24. The body 2 also includes a stem portion 25, which is also substantially cylindrical with a smaller diameter than the gripping portion 21. The stem portion 25 is coaxial with the gripping portion 21 and extends from one of its ends. The blind bore 20 has an open end 26 in the centre of the stem portion 25 and extends from the open end 26 to a closed end 27 in the gripping portion 21. The blind bore 20 extends coaxially with the stem portion 25 and the gripping portion 21.

The retaining element 3 is in the form of a coil in this embodiment, specifically a close wound spring 30. The spring 30 includes a plurality of coils 31 and is formed of a stainless steel in this embodiment, but it may be formed from any suitable material.

The threaded insert 4 is substantially cylindrical with a central threaded bore 40 extending axially through the insert 4, a gripping portion 41 and a lead-in portion 42. The gripping portion 41 has a larger diameter than the lead-in portion 42 and includes gripping features (not shown) on its outer cylindrical surface, such as knurls and the like. In the assembled condition the insert 4 is received within the open end 26 of the blind bore 20 with the gripping features (not shown) of the gripping portion 41 engaged in an interference fit with the circumferential surface of the blind bore 20. It will be appreciated that the insert 4 is considerably shorter than the blind bore 20 and, as such, the blind bore 20 includes a non-threaded portion between the insert 4 and the closed end 27 thereof. The threaded insert 4 is formed of brass in this embodiment, but it may be formed from any suitable material.

The bolt 5 includes a shaft 50 and a head 51 perpendicular to the shaft 50 to provide a substantially T-shaped cross-section. The head 51 has a frusto-conical cross-section and each lateral end of the head has a chamfered configuration to enable the head 51 to be rotated within the slot 10 in the support member 11 to an engaged position in a first direction, but not in a second direction opposite the first direction. More specifically, each lateral end of the head 51 includes a first chamfer 52 on its upper surface and a second chamfer 53 on its lower surface. The first chamfers 52 are on first and second, diagonal corners and the second chamfers 53 are on third and fourth, diagonal corners.

The shaft 50 includes a threaded end portion 54, a threaded central portion 55 and first and second non-threaded portions 56, 57. The threaded end portion 54 is located at an opposite end thereof to the head 51. The first non-threaded portion 56 is between the threaded end portion 54 and the threaded central portion 55. The second non-threaded portion 57 is between the threaded central portion 55 and the head 51.

The thread configuration, i.e. the thread diameter and pitch, of the threaded end portion 54 and of the threaded central portion 55 are the same and both are configured to cooperate with the central threaded bore 40 of the threaded insert 4. In addition, the wire thickness of the coils 31, the tightness of the wound coil and the internal diameter of the coil form is such that the spring 30 provides an interference fit onto the thread form of the threaded end portion 54. More specifically, the internal diameter of the spring 30 is slightly smaller than the diameter of the root diameter of the threaded end portion 54 and the wire thickness of the coils 31 is such that they engage with the threaded end portion 54 and are retained in its threads.

In order to assemble the connector 1, the spring 30 is placed into the blind bore 20 of the body 2, followed by the lead-in portion 42 of the threaded insert 4. The threaded insert 4 is then forced into the blind bore 20, for example using a hammer (not shown) or press (not shown), to force the gripping portion 41 into interference fit engagement with the circumferential surface of the blind bore 20. As such, the spring 30 is captivated or clamped between the closed end 27 of the blind bore 20 and the insert 4.

If the connector 1 is to be used in isolation, the threaded end portion 54 of the shaft 50 of the bolt 5 is inserted directly into the threaded bore 40 of the insert 4. However, if the connector 1 is to be used as part of a bracket assembly 6, shown in FIGS. 4-7, the shaft 50 of the bolt 5 is first inserted through a hole 60 in a mounting member 61, which is a mounting plate 61 with mounting features 62 in this embodiment.

The bolt 5 is then rotated until the threaded end portion 54 clears the threaded bore 40 such that the shaft 50 is loosely received therein. The bolt 5 is then inserted further until the threaded central portion 55 engages the threaded bore 40, at which point it is rotated until the threaded end portion 54 contacts the spring 30, a position illustrated in FIG. 6.

The direction of the coil winding of the spring 30 is sympathetic to the direction of the thread form of the threaded end portion 54. As such, further rotation of the bolt 5 causes the threaded end portion 54 to engage the coils 31 of the spring 30, thereby urging the coils 31 into the threads and expanding the coils 31 such that they are sandwiched between the threaded end portion 54 of the shaft 50 and the internal surface of the blind bore 20. In other words, an interference fit is created between the spring 30 and the threaded end portion 54 and between the spring 30 and the internal surface of the blind bore 20. Each coil 31 is received in the root of one of the thread turns, thereby providing a robust engagement between the spring 30 and the threaded end portion 54 of the shaft 50. As such, if the bolt 5 is rotated in the opposite direction, moving the head 51 away from the body 2 and releasing the central threaded portion 55 from the threaded hole 40, the spring 30 prevents the threaded end portion 54 from engaging the threaded hole 40. This prevents removal of the bolt 5 from the body 2.

FIG. 8 shows a support member 11, which is a hollow beam 11 having a circular cross-section in this embodiment, having four equispaced external slots 10 about its periphery and an internal slot 12 between each pair of external slots 10. The internal slots 12 are formed by part-cylindrical formations on the inside of the beam 11 and are configured to receive and engage screws (not shown) used to secure a node fitting (not shown) to the end of the beam 11. The external slots 10 are defined in part by longitudinal interruptions in the circular wall of the beam 11 and in part by hollow, closed formations on the inside of the beam 11 which have a frusto-conical shape that corresponds to the cross-sectional shape of the head 51 of the bolt 5. The longitudinal interruptions are narrower than the frusto-conical hollow closed formations, thereby creating a pair of opposed lips or overhangs 13.

In use, the head 51 of the bolt 5 is aligned with and inserted into the slot 10 in the beam 11. The gripping portion 21 of the body 2 is then rotated, which causes the bolt 5 to rotate by virtue of the interference fit between the blind bore 20, the spring 30 and the threaded end portion 54 of the shaft 50. The chamfers 52, 53 of the head 51 enable the head 51 to be rotated within the slot 10 toward a perpendicular orientation, until the lateral ends of the head 51 engage the sides of the slot 10 to such an extent as to prevent further rotation. Continued rotation of the gripping portion 21 draws the head 51 toward the body 2 to captivate or clamp the lips 13 of the slot 10 between the head 51 of the bolt 5 and the stem portion 25 of the body 2, thereby securing the mounting plate 61 to the beam 11.

The connector 1 may alternatively be used in isolation, for example to secure a shelf (not shown) or other feature to a support member 11. This can be achieved using a bracket (not shown) having a vertical plate portion with a downwardly extending slot with an open lower end. The connector 1 could be placed in the slot 10 as described above and the slot of the bracket (not shown) could be aligned with and lowered onto the bolt 5 before rotating the gripping portion 21 to secure the bracket (not shown) to the beam 11 as described above. Alternatively, the connector 1 may be incorporated into a bracket of the kind described in GB2480475.

It will be appreciated by those skilled in the art that several variations to the aforementioned embodiments are envisaged without departing from the scope of the invention. For example, the spring 30 may be replaced with a resilient tube or any other suitable element. In some embodiments, the shaft 50 of the bolt 5 includes an axial hole, which may be threaded, at the opposite end thereof to the head 51 and which is configured to engage with an alternative retaining element 3, such as a plug. The threaded insert 4 may be heated and melted into position or bonded with an adhesive in the blind bore 20. Alternatively, the threaded insert 4 may comprise a threaded sleeve that is secured in place using, for example, a set screw or other arrangement.

The shaft 50 may be threaded along its length, although the first non-threaded portion 56 is between the threaded end portion 54 and the threaded central portion 55 is advantageous for reasons that would be appreciated by the skilled person. More particularly, the non-threaded portion 56 ensures that the threads of the bolt 5 disengage from the threaded bore 40 to prevent the coils 31 of the spring 30 from being forced against the threads in the threaded bore 40, thereby damaging them. The head 51 of the bolt 5 may have a different shape, for example L-shaped to captivate or clamp a slot or other feature of a different support member, e.g. having a single overhang instead of a pair of opposed lips 13. Other head 51 shapes and designs are also envisaged.

Moreover, the body 2 need not be in the form of a knob 2 and it need not include a gripping surface 24. The body 2 may include a handle or have any suitable shape. The bolt 5 need not be shaped or configured as shown in the preferred embodiments. The blind bore 20 may comprise a through bore and need not have a closed end 27. Other variations will be appreciated by those skilled in the art. It will also be appreciated by those skilled in the art that any number of combinations of the aforementioned features and/or those shown in the appended drawings provide clear advantages over the prior art and are therefore within the scope of the invention described herein.

The invention claimed is:

1. A connector for releasably engaging a slot in a support member, the connector comprising:
   a body with a bore having a threaded hole with a non-threaded portion and a threaded portion at or adjacent to an open end thereof; and
   a bolt comprising:
      a shaft received within the threaded hole;
      a head at or adjacent to a first end of the shaft; and
      a resilient tubular retaining element secured to the shaft at or adjacent to a second end thereof and received within the non-threaded portion of the body to inhibit removal of the shaft from the body;
   wherein the shaft comprises:
      a threaded end portion, at least a portion of which is surrounded by and engaged with the resilient tubular retaining element;
      a central threaded portion having a thread configuration that is substantially the same as the thread configuration of the threaded end portion; and
      a non-threaded portion between the central threaded portion and the threaded end portion;
   wherein the central threaded portion is between the head and the resilient tubular retaining element and is configured to engage the threaded hole such that rotation, in use, of the body relative to the bolt draws the head toward the body to captivate or clamp an overhang of a slot in a support member between the head and the body.

2. Connector according to claim 1, wherein the bore comprises a blind bore and the retaining element is captivated or clamped between a closed end of the blind bore and the threaded portion thereof.

3. Connector according to claim 1, wherein the body comprises a threaded insert secured in the open end of the bore to provide the threaded hole.

4. Connector according to claim 1, wherein the resilient tubular retaining element engages the non-threaded portion of the bore such that rotation, in use, of the body causes the bolt to rotate therewith until the head engages with the slot.

5. Connector according to claim 1, wherein the resilient tubular element comprises a coiled element or a solid hollow cylinder.

6. Connector according to claim 1, wherein the body comprises a knob having a gripping surface for manual rotation of the body.

7. A method of assembling a connector for releasably engaging a slot in a support member, the method comprising inserting a threaded shaft of a bolt into a threaded hole provided by a threaded open end portion of a blind bore in a connector body, causing the shaft to force the retaining element against a closed end of the blind bore and over an end of the shaft, thereby securing the retaining element to the shaft, and rotating a head of the bolt relative to the body such that the threaded shaft engages with the threaded hole to translate the bolt along the body, thereby engaging a retaining element to secure the retaining element to the shaft for inhibiting removal of the shaft from the body.

8. Method according to claim 7, wherein the shaft comprises a threaded end portion and the retaining element comprises a resilient tubular element, the method comprising rotating the shaft to force the threaded end portion into threaded engagement with the resilient tubular element.

9. Method according to claim 8, wherein the resilient tubular element comprises a coiled element, the method comprising rotating the shaft to force the coiled element into the threads of the threaded end portion.

10. A connector for releasably engaging a slot in a support member, the connector comprising a body with a blind bore and a bolt with a shaft, a head at or adjacent to a first end of the shaft, a resilient retaining element at or adjacent to a second end of the shaft and a central threaded portion on the shaft between the head and the resilient retaining element, wherein the resilient retaining element is received within and engages a non-threaded portion of the blind bore and is captivated between a closed end of the blind bore and a threaded portion at or adjacent to an open end thereof, the central threaded portion of the shaft engaging the threaded portion of the blind bore such that rotation, in use, of the body causes the bolt to rotate therewith until the head engages with a slot in a support member, then continued rotation of the body relative to the bolt draws the head toward the body for captivating or clamping an overhang of the slot between the head and the body.

11. Connector according to claim 10, wherein the body comprises a threaded insert secured in the open end of the blind bore to provide the threaded portion.

12. Connector according to claim 10, wherein the shaft comprises a threaded end portion and the resilient retaining element comprises a resilient tubular retaining element surrounding and engaged with at least a portion of the threaded end portion.

13. Connector according to claim 12, wherein the shaft comprises a non-threaded portion between the central threaded portion and the threaded end portion.

14. Connector according to claim 12, wherein the resilient tubular element comprises a coiled element or a solid hollow cylinder.

* * * * *